(12) United States Patent
Baales et al.

(10) Patent No.: US 10,086,673 B2
(45) Date of Patent: Oct. 2, 2018

(54) WHEEL SUSPENSION UNIT WITH STABILIZER ARRANGEMENT

(71) Applicant: FORD GLOBAL TECHNOLOGIES, LLC, Dearborn, MI (US)

(72) Inventors: Simon Baales, Cologne (DE); Jens Dornhege, Pulheim (DE); Michael Seemann, Köln (DE); Martin Saeger, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 336 days.

(21) Appl. No.: 14/181,310

(22) Filed: Feb. 14, 2014

(65) Prior Publication Data

US 2014/0224606 A1    Aug. 14, 2014

(30) Foreign Application Priority Data

Feb. 14, 2013   (DE) .................. 10 2013 202 371

(51) Int. Cl.
*B60G 17/056*   (2006.01)
*B60G 21/02*    (2006.01)
(Continued)

(52) U.S. Cl.
CPC ....... *B60G 17/056* (2013.01); *B60G 17/0162* (2013.01); *B60G 21/026* (2013.01);
(Continued)

(58) Field of Classification Search
CPC .............. B60G 17/0162; B60G 17/056; B60G 21/026; B60G 21/0558; B60G 21/06;
(Continued)

(56) References Cited

U.S. PATENT DOCUMENTS

| 5,244,063 A | 9/1993 | Laurien et al. |
| 5,362,094 A * | 11/1994 | Jensen ............... B60G 21/0555 280/124.107 |

(Continued)

FOREIGN PATENT DOCUMENTS

| DE | 4033190 C1 | 1/1992 | |
| DE | 19711293 A1 * | 11/1997 | ............... F16F 9/06 |

(Continued)

OTHER PUBLICATIONS

German Patent Office Examination Report, dated Oct. 15, 2013, in corresponding German patent application 10 2013 202 371.5.

(Continued)

*Primary Examiner* — Xuan Lan T Nguyen

(74) *Attorney, Agent, or Firm* — Jones Robb, PLLC; Frank MacKenzie

(57) ABSTRACT

A wheel suspension unit is disclosed. The wheel suspension unit includes a stabilizer having a first end and a second end, a wheel suspension element, and a piston-cylinder unit. The piston-cylinder unit connects an end of the stabilizer to the wheel suspension element. The piston-cylinder unit is a roll damper. The roll damper includes a plurality of roll damping valves arranged in a piston of the roll damper. Each of the plurality of roll damping valves has a non-return valve and an adjustable throttle valve. The non-return valve is arranged in series with the adjustable throttle valve.

5 Claims, 4 Drawing Sheets

(51) Int. Cl.
   *B60G 21/06* (2006.01)
   *B60G 17/016* (2006.01)
   *B60G 21/055* (2006.01)
(52) U.S. Cl.
   CPC ......... *B60G 21/0558* (2013.01); *B60G 21/06* (2013.01); *B60G 2204/82* (2013.01)
(58) Field of Classification Search
   CPC ...... B60G 2204/82; F16F 9/06; F16F 9/0227; F16F 9/3214; F16F 9/466; F16F 9/465
   USPC ...... 188/322.13–322.15, 282.1, 282.2, 282.8
   See application file for complete search history.

(56) References Cited

U.S. PATENT DOCUMENTS

| | | | | |
|---|---|---|---|---|
| 5,533,597 | A * | 7/1996 | Nezu | B60G 17/0165 188/266.4 |
| 5,956,951 | A * | 9/1999 | O'Callaghan | B60G 17/08 188/267.1 |
| 5,996,748 | A * | 12/1999 | Nezu | F16F 9/46 188/266.5 |
| 6,092,816 | A * | 7/2000 | Sekine | B60G 17/0152 267/64.17 |
| 6,202,805 | B1* | 3/2001 | Okada | F16F 9/3214 188/266.2 |
| 6,276,693 | B1 | 8/2001 | Oakley et al. | |
| 6,598,943 | B2 | 7/2003 | Harris | |
| 6,761,371 | B1* | 7/2004 | Heyring | B60G 21/06 280/124.157 |
| 6,817,454 | B2* | 11/2004 | Nezu | B60G 17/08 188/282.2 |
| 6,860,369 | B2 | 3/2005 | Weiffen et al. | |
| 7,234,714 | B2 | 6/2007 | Germain et al. | |
| 7,828,307 | B2 | 11/2010 | Ersoy et al. | |
| 2002/0011388 | A1* | 1/2002 | Weiffen | B60G 17/08 188/322.13 |
| 2003/0132073 | A1* | 7/2003 | Nakadate | F16F 9/3214 188/282.2 |
| 2004/0173985 | A1* | 9/2004 | Bruhl | B60G 21/0551 280/124.106 |
| 2009/0200125 | A1* | 8/2009 | Sonsterod | B60G 17/056 188/266.4 |
| 2010/0155186 | A1* | 6/2010 | Preukschat | B60G 17/04 188/317 |

FOREIGN PATENT DOCUMENTS

| | | | | |
|---|---|---|---|---|
| DE | 19849221 | A1 | | 5/2000 |
| DE | 10062999 | A1 | | 7/2002 |
| DE | 10134715 | A1 | | 2/2003 |
| DE | 102004025806 | A1 | | 12/2005 |
| EP | 0591754 | A1 * | 4/1994 | ........... B60G 17/016 |
| EP | 1067011 | A1 * | 1/2001 | ............. B60M 1/26 |
| EP | 1000782 | B1 | | 4/2008 |
| JP | 04160241 | A * | 6/1992 | |
| JP | 05087174 | A * | 4/1993 | |

OTHER PUBLICATIONS

Notification of First Office Action for related Chinese Patent Application No. 201410051151.X, dated Mar. 2, 2017, with an English Translation.

* cited by examiner

WHEEL SUSPENSION UNIT WITH STABILIZER ARRANGEMENT

CROSS REFERENCE TO RELATED APPLICATIONS

This application claims priority to German Application No. 102013202371.5, filed on Feb. 14, 2013, the entire content of which is incorporated by reference herein.

TECHNICAL FIELD

The present disclosure relates generally to roll damping system for a motor vehicle, and more particularly, to a wheel suspension unit including a stabilizer connected via a piston-cylinder damping unit to a wheel suspension element.

BACKGROUND

The stabilizer is a spring element in automotive vehicles which contributes to improving ground contact. The stabilizer connects opposing wheels by levers and a torsion bar spring. The spring action is achieved by the twisting (torsion) of torsion bars which often have a round cross-section. The central part of the stabilizer is rotatably arranged on the vehicle body and angled ends of the stabilizer, which act as levers, are attached via rubber elements and/or coupling rods to the wheel suspension elements such as suspension arms. When a first wheel is lifted (unilateral/reciprocal deflection) the opposing wheel is also lifted by the torsion of the stabilizer, and the opposing wheel also is lowered when the first wheel is lowered. As a result, rolling of the vehicle body is counteracted during cornering. With simultaneous deflection of both wheels, the stabilizer does not come into operation. Unilateral deflection during straight line motion (due to road unevenness) leads to movements of the vehicle about the longitudinal axis.

Generally, for reasons of comfort, a relatively soft suspension is desired, but for reasons of driving safety and also load-bearing capacity, a relatively hard suspension is desired.

In modern motor vehicles soft chassis springs are used for a high degree of driving comfort. In combination with correspondingly designed shock absorbers, improved ground contact is thus ensured in the event of road unevenness. The disadvantageous increase in the rolling angle on cornering which occurs here is compensated by the use of stabilizers secured to the vehicle chassis.

The stabilizer will considerably reduce the rolling of the vehicle, provided the stabilizer is not restricted in its action, so that the rolling angle is able to be reduced during cornering. For adequate anti-rolling action, a high rigidity of the stabilizer is necessary. In order to achieve a high degree of driving comfort, however, a lower degree of rigidity of the stabilizer is desired.

With this in mind, the object of the present disclosure is to provide a wheel suspension unit with a stabilizer which reduces rolling of the vehicle while improving driving comfort of the vehicle.

SUMMARY

In accordance with various exemplary embodiments, the present disclosure provides a wheel suspension unit. The wheel suspension unit comprises a stabilizer having a first end and a second end, a wheel suspension element, and a piston-cylinder unit. The piston-cylinder unit connects an end of the stabilizer to the wheel suspension element, wherein the piston-cylinder unit is a roll damper. The roll damper comprises a plurality of roll damping valves arranged in a piston of the roll damper. Each of the plurality of roll damping valves comprises a non-return valve and an adjustable throttle valve, wherein the non-return valve is arranged in series with the adjustable throttle valve.

In accordance with another aspect of the present disclosure, a roll damper is provided. The roll damper comprises a cylinder, a piston movably positioned within the cylinder, wherein the piston separates a first hydraulic chamber from a second hydraulic chamber in the cylinder. A first hydraulic channel and a second hydraulic channel are formed in the piston, each hydraulic channel providing fluid communication between the first and second hydraulic chambers. A first damping valve is positioned in the first hydraulic channel and permits one-way fluid flow from the second hydraulic chamber to the first hydraulic chamber. A second damping valve is positioned in the second hydraulic channel and permits one-way fluid flow from the first hydraulic chamber to the second hydraulic chamber.

In accordance with yet another aspect of the present disclosure, a roll damping system for a vehicle suspension is provided. The roll damping system comprises a stabilizer having a central portion and first and second end portions, a first roll damper connected to the first end portion of the stabilizer, and a second roll damper connected to the second end portion of the stabilizer. Each roll damper comprises a piston and cylinder arrangement, the piston of each damper comprising first and second damping valves. Each roll damper is controllable to select between soft damping characteristic and a stiff damping characteristic.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
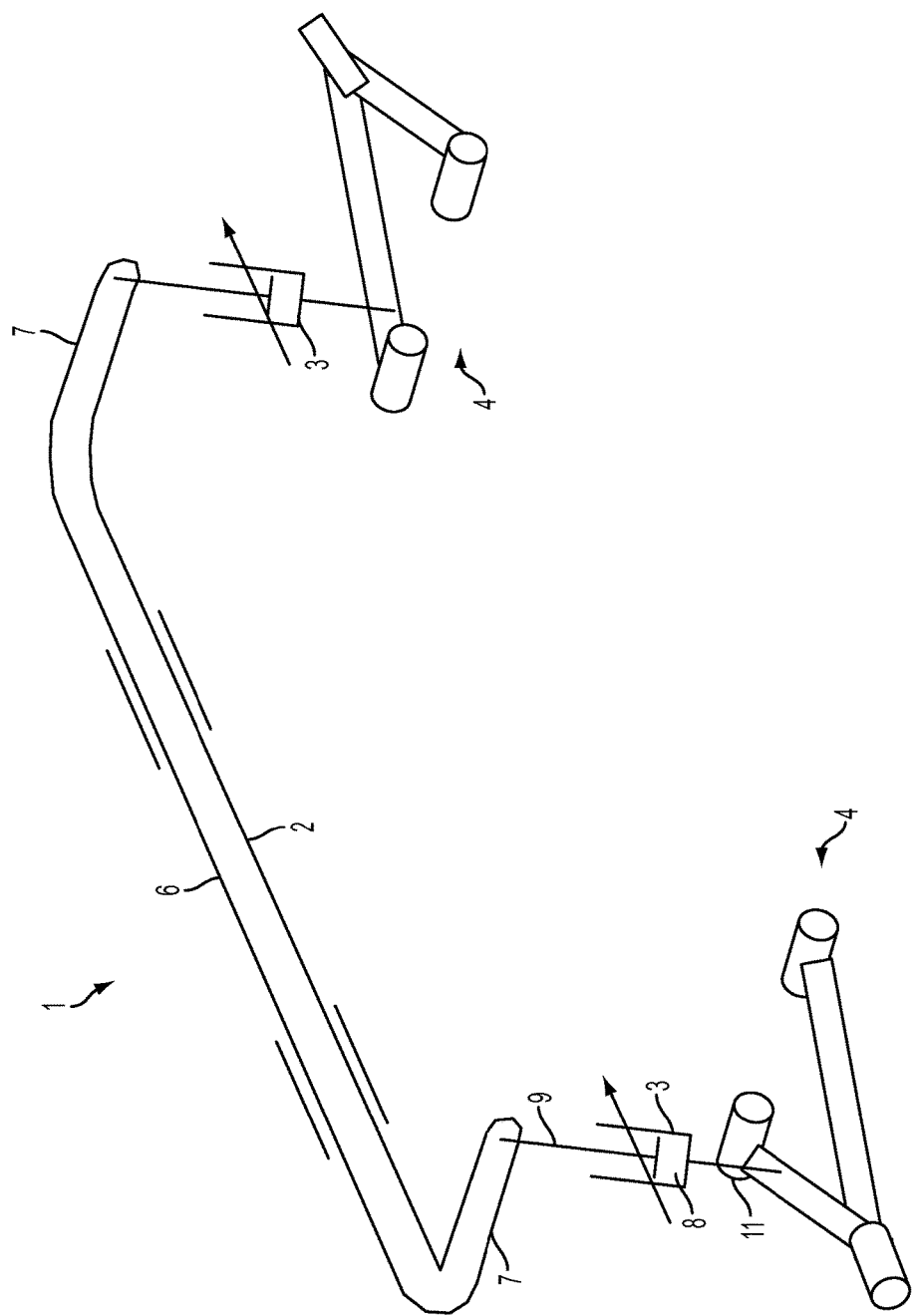
FIG. 1 shows a perspective view of a wheel suspension element with a stabilizer arrangement and an adaptable roll damper in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a roll damping device is disclosed. The device includes a stabilizer and at least one roll damper. At least one end of the stabilizer is connected to a wheel suspension element via a piston-cylinder unit. The piston-cylinder unit is designed as a roll damper, and preferably designed as an adjustable roll damper. It is also envisioned that each end of the stabilizer is connected to a wheel suspension element via a roll damper, and preferably an adjustable roll damper, is thus arranged on each side of the stabilizer.

As used herein, a "roll damper" is a piston-cylinder unit which is able to be switched between an unblocked position and a blocked position, and which also absorbs and at least reduces and/or dissipates in an absorbing manner the rolling of the vehicle chassis. Reduction and/or dissipation of rolling of the vehicle chassis occurs due to resilient and damping properties being produced by the piston-cylinder unit dependent on the frequency, such that the actual function of the stabilizer is restricted or limited. As used herein, an "adjustable" roll damper is adjustable according to the desired damping characteristic curve of the roll damper. As used herein, "rolling" is the amount the vehicle rolls about its longitudinal axis.

The roll damper may be designed as a single tube system, in which a piston arranged on a piston rod is mounted in the cylinder in an axially movable manner. The piston subdivides the cylinder chamber into two hydraulic chambers. Additionally, a compensation chamber may be provided.

Roll damping valves are arranged in the piston in hydraulic channels which fluidly connect the two hydraulic chambers, a hydraulic compression chamber and a hydraulic rebound chamber.

Each damping valve, i.e., each roll damping valve, has in its hydraulic substitution model the function of a non-return valve and the function of an adjustable throttle valve. The hydraulic functions are arranged in succession, i.e., in series. In order to achieve pressure damping of the roll damper (i.e., compression damping), in the hydraulic substitution model of the damping valve, the function of the non-return valve is arranged on the surface of the piston opposing the piston rod, in the relevant channel of the piston, and the function of the adjustable throttle valve is arranged on the piston rod side of the piston. In order to achieve rebound damping, the hydraulic model of the damping valve is arranged in the opposite direction to the hydraulic model of the damping valve for pressure damping. This means that the function of the non-return valve is arranged in the relevant channel on the piston rod side of the piston and the function of the adjustable throttle valve is arranged on the surface of the piston opposing the piston rod. The piston rod in this case is arranged on (e.g., connected to) the stabilizer and/or a lever thereof, wherein the cylinder unit is arranged, for example, on a suspension arm of a wheel suspension.

By means of this exemplary embodiment, a frequency-dependent roll suspension and/or roll damping which is fixed in time (i.e., the roll damper is tuned when produced and is not subsequently tunable) may be achieved for all driving situations, wherein the actual function of the stabilizer is not restricted or limited. This could be the case if the piston-cylinder unit were completely unblocked. In this embodiment the stabilizer (e.g., roll bar or torsion element) acts as a spring element, and is connected in series with the hydraulic damper element (e.g., the roll damper).

During straight-line motion of a vehicle and/or during off-road travel, less roll stability is required, and damping of the vehicle motion is desired. The use of a stabilizer alone, without the roll damper, can cause an uncomfortable ride (i.e., the suspension is too hard). The use of the stabilizer (spring element) in combination with the damper softens the suspension. As the roll damper is frequency dependent, the roll damper does not interfere with the function of the stabilizer at lower speeds, or on rough roads, when roll control provided by the stabilizer is more desirable.

The damping valves are able to be adjusted to the desired damping characteristic curve during the production of the roll damper, and thus, cannot be altered in the hydraulic channel. In an exemplary embodiment in which two damping valves are provided, the valves are set at different values to provide compression damping and rebound damping. For example, if each damping valve includes a check valve (one-way valve) and a throttle valve, the amount of throttle may be set at different values for each damping valve. Thus, for example, a pressure (compression) damping valve may have a first flow rate and a rebound damping valve may have a second flow rate, different from the first flow rate. Depending on the vehicle application, it is possible to have a higher damping (e.g., a lower flow rate) in compression and lower damping in rebound (e.g., a higher flow rate), or vice versa (compression: low damping/high flow and rebound high damping/low flow rate).

Additionally, in various exemplary embodiments in accordance with the present teachings, a control valve is provided. The control valve is arranged in a main portion of a hydraulic channel, the hydraulic channel splitting into two channel branches. A damping valve is arranged in each respective channel branch. Advantageously, one of the damping valves is designed for pressure damping (compression damping) and the other for rebound damping. Compression damping may occur when less roll stability is required, for example, during straight road driving or during off-road driving. In such a case, the roll damper may be set to a softer setting. In cases in which more roll stability is desired, such as during higher lateral acceleration, the roll damper may be set to a stiffer setting. The softness and/or stiffness of the roll damping characteristic may be set by, for example, controlling a rate of flow between the first and second hydraulic chambers. In this respect, the arrangement of the hydraulic functions of the non-return valve and the adjustable throttle valve of the damping valve arranged in the relevant channel branch, i.e., the hydraulic substitution model, is identical to the above-described damping valves. The control valve is arranged in the main portion of the hydraulic channel on the piston rod side of the piston and is in fluid communication with a relevant hydraulic chamber adjacent to the piston rod side of the piston. The two channel branches lead into the opposing hydraulic chamber. By means of the control valve, the two additional damping valves are able to be connected to the above-described damping valves in the channel branches, wherein the control valve permits a changeable controllable passage opening, in contrast to the above-described unalterable passage openings of the damping valves, so that it is effectively possible to switch from a soft characteristic curve to the hard characteristic curve. Thus a degressive damping characteristic curve is achieved, the characteristic curve in the low speed range having a steeply sloping branch and in the high speed range having a flat branch. Thus, rocking of the vehicle may be avoided by simple means, wherein movements in the natural frequency range are successfully reduced, i.e., damped.

The control valve may be, for example, a solenoid valve, and actuation of the control valve may be controlled by a control system such as an electronic control unit, a microprocessor, or other control system. Actuation of the control valve may be based on driving conditions determined by sensed vehicle conditions and/or based on driver selection. For example, a controller may receive signals from existing vehicle sensors, such as, for example, a vehicle speed sensor and/or a steering angle sensor, wheel speed sensors, suspension height sensors, a vertical acceleration sensor, a lateral acceleration sensor, a yaw rate sensor, roll damper travel sensors, and a stabilizer bar deflection sensor and, based on those signals, control actuation of the control valve to provide softer or stiffer roll damping depending on the sensed conditions. Additionally or alternatively, a driver may be able to select a desired mode, such as the type of ride desired or the type of driving to be done (e.g., highway versus off-road driving).

In accordance with the present disclosure, the roll damping may be adapted according to the driving situation, wherein low damping is expedient, for example, when traveling on rough terrain or poor road surfaces, so that little vibration excitation from the road surface is introduced into the vehicle chassis. Additionally and/or alternatively, high damping may be desirable in high speed or off-road situations.

In accordance with the present teachings, the damping operation is carried out when the vehicle rolls, such that the movement of the vehicle about its roll axis is reduced. In this case, however, the energy is not completely stored in the stabilizer spring as known in the prior art, but is dissipated by the roll damper to a considerable extent.

The roll damper also has a compensation chamber which may be filled with a gaseous medium and which in an exemplary embodiment may be arranged inside the cylinder. A change in volume created by the piston rod moving out of the cylinder and/or into the cylinder is compensated for by an expansion and/or compression of the gas in the compensation chamber.

Alternatively, the compensation chamber may be arranged outside the cylinder unit and connected to one of the hydraulic chambers via a connecting line. The compensation chamber in this case may be filled both with a hydraulic fluid and a gas, and the connecting line may be connected to the compensation chamber in the region of the chamber which contains the hydraulic fluid. A sealing piston may be arranged between both media. For example, the compensation chamber may lead with its connecting line into the hydraulic chamber on the piston side or into the opposing hydraulic chamber.

It is also possible that the compensation chamber may be arranged on the piston rod side, inside the cylinder and coaxially around the piston rod, i.e., it may form in an internal deformable tank. This construction is able to be implemented by an internal piston stop.

Instead of a single tube system, the roll damper also may be designed as a double tube system, in which an internal cylinder is surrounded by an outer casing. A piston guided on a piston rod is arranged in the cylinder, and a connecting channel to the outer casing is provided in the base of the cylinder. A bypass connects the hydraulic chamber on the piston rod side to the outer casing.

In the double tube system, it may be advantageous if damping valves are arranged both in the piston and in the cylinder base.

In an exemplary embodiment, one respective pressure damping valve and one respective rebound damping valve are arranged both in the piston and in the cylinder base, and a control valve and an adjustable throttle valve are arranged in the bypass. In this exemplary embodiment, the throttle valve is preferably arranged in the bypass on the piston rod side. The control valve is then preferably provided on the base side, i.e., arranged in the portion of the bypass which is connected to the outer casing.

Additionally and/or alternatively, similar to the single tube system, one respective control valve may be arranged in one respective main channel in the piston and also in the cylinder base, which in each case has one of the above-described damping valves in the channel branches thereof.

FIG. 1 shows a wheel suspension unit 1 which has a stabilizer 2. Each end of the stabilizer 2 is connected to a wheel suspension element 4 via a piston-cylinder unit 3. The piston-cylinder unit 3 is designed as an adaptable roll damper 3. The wheel suspension element 4 is designed, for example, as a suspension arm 4. Further elements of the wheel suspension unit 1 are not shown but would be understood by those of ordinary skill in the art.

The stabilizer 2 has a central part 6 and levers 7 arranged at each end of the stabilizer, the levers 7 being angled back from the central part 6. The adjustable roll damper 3 is connected by means of its piston 8 and/or by means of its piston rod 9 to the end of the lever 7 and the cylinder unit 11 is connected to the exemplary suspension arm 4. In an alternative exemplary embodiment, it is envisioned that the cylinder unit 11 is connected to the end of lever 7 and the piston rod 9 is connected to the exemplary suspension arm 4. Although illustrated as containing two roll dampers 3, it is contemplated that a roll damping system in accordance with the present teachings may include only a single roll damper.

Figure 2:
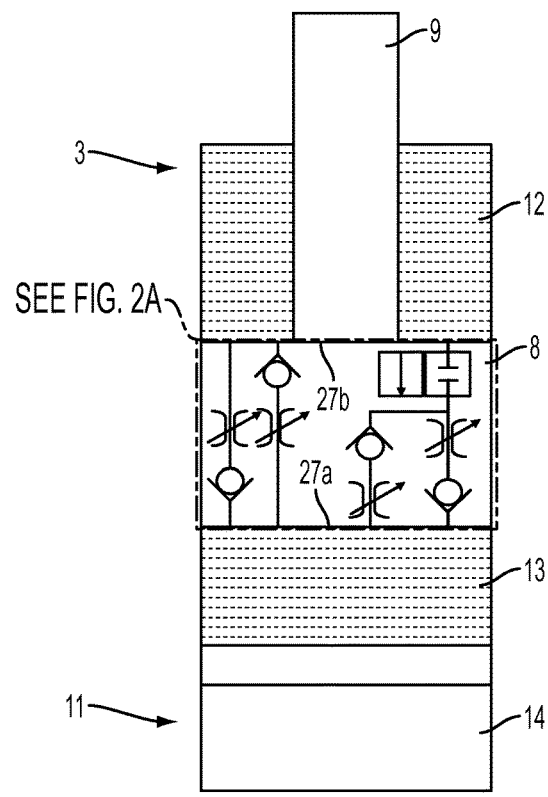
FIG. 2 is a cross-sectional view of a first embodiment of a roll damper to be used in the system of FIG. 1 in accordance with the present teachings.

In FIG. 2, a first exemplary embodiment of an adjustable roll damper 3 is shown as an individual unit in accordance with one aspect of the present disclosure. As shown, the adjustable roll damper 3 is designed as a single tube system, and the piston 8 subdivides the cylinder 11 into two hydraulic chambers 12 and 13. Additionally, a compensation chamber 14 is provided. The hydraulic chambers 12 and 13 are filled with hydraulic fluid, while the compensation chamber 14 is filled with a compressible, preferably gaseous, medium. Hydraulic chamber 12 may be characterized as a hydraulic rebound chamber and hydraulic chamber 13 may be characterized as a hydraulic compression chamber.

Figure 2A:
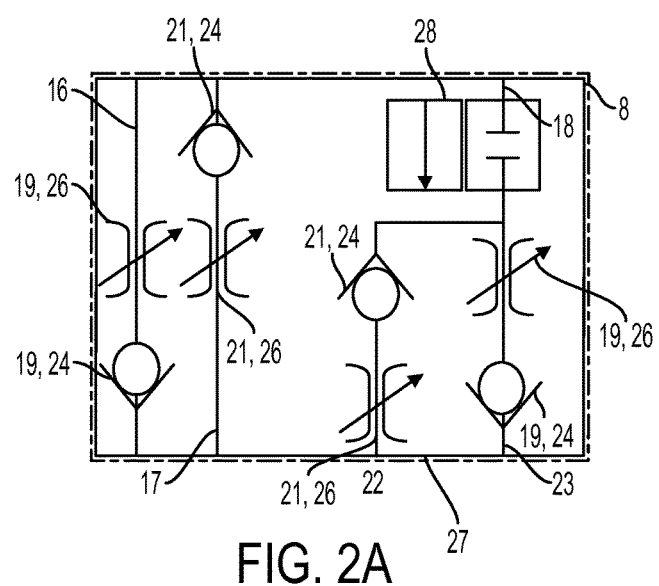
FIG. 2A is an enlarged view of the piston of FIG. 2.

Hydraulic channels 16, 17 and 18 are arranged in the piston 8. FIG. 2A illustrates the piston 8 of FIG. 2 in detail. As shown in FIG. 2A, damping valves 19 and 21 are arranged in the hydraulic channels 16, 17, and 18. The hydraulic channels 16 and 17 do not include branches, while the hydraulic channel 18 is subdivided into two channel branches 22 and 23.

In FIGS. 2, 2A, and 3-6, the damping valves 19 and 21 are shown in each case in their hydraulic substitution models. This means that the physical elements shown in FIGS. 2, 2A, and 3-6 represent hydraulic functions. Thus, the hydraulic function of a non-return valve is assigned the reference numeral 24, wherein the function of an adjustable throttle valve is assigned the reference numeral 26. Hereinafter, for the sake of simplicity, the respective functions are denoted as the non-return valve 24 or adjustable throttle valve 26. The damping valves 19 and 21 each have a non-return valve 24 and an adjustable throttle valve 26. The damping valves 19 and 21 are oriented differently in the respective hydraulic channels 16, 17, 18 and 22 and 23. The non-return valve 24 is arranged in series with the adjustable throttle valve 26.

In order to achieve in the hydraulic substitution model of a pressure damping (compression damping) of the roll damper 3, the non-return valve 24 is arranged on the surface 27a of the piston 8 that opposes the piston rod 9 in the hydraulic channel 16, while the adjustable throttle valve 26 is arranged on the surface 27b of piston 8 adjacent the piston rod 9. In order to achieve rebound damping, the damping valve 21 is arranged in the opposite direction as compared to the case of pressure damping (damping valve 19). This means that the non-return valve 24 is arranged the surface 27b of piston 8 adjacent the piston rod 9 in hydraulic channel 17, while the adjustable throttle valve 26 is arranged on the surface 27a of the piston 8 that opposes the piston rod 9. The piston rod 9 in this case is arranged on the stabilizer 2 and/or on the lever 7 thereof, while the cylinder unit 11 is arranged, for example, on the suspension arm 4.

Chronologically uniform roll damping is possible by means of the damping valves 19 and 21 arranged in both channels 16 and 17. The damping valves 19 and 21 are able to set to the desired damping characteristic curve during the production of the roll damper 3 and those characteristics are set such that they are no longer able to be altered in during use in the roll damper 3.

A control valve 28 is arranged in a main part of the hydraulic channel 18, while a damping valve 19 and a damping valve 21 are arranged in the channel branches 22 and 23, respectively. Advantageously, the damping valve 19 is designed as before for pressure (compression) damping and the damping valve 21 is designed for rebound damping. In this respect, the arrangement of the damping valves 19 or 21 arranged in the relevant channel branch 22 and 23, with the controllable throttle valve 26 arranged in series with the non-return valve 24, is identical to that of the above-described damping valves 19 and 21. The control valve 28 is arranged in the main hydraulic channel 18 which on the piston rod side leads into the adjacent hydraulic chamber 12. The two channel branches 22 and 23 lead into the opposing hydraulic chamber 13. By means of the control valve 28, the two additional damping valves 19 and 21 are able to be connected in the channel branches 22 and 23 to the above-described damping valves 19 and 21, while on the other hand, the control valve 28 permits a changeable and controllable passage opening, so that effectively a soft characteristic curve is able to be switched over to the hard characteristic curve. The control valve 28 may be, for example, a solenoid valve, and actuation of the control valve may be controlled by a control system such as an electronic control unit, a microprocessor, or other control system (not shown). Actuation of the control valve 28 may be based on driving conditions determined by sensed vehicle conditions and/or based on driver selection. For example, a controller may receive signals from existing vehicle sensors, such as a vehicle speed sensor and/or a steering angle sensor (not shown), and based on those signals, control actuation of the control valve 28 to provide softer or stiffer roll damping depending on the sensed conditions. Additionally or alternatively, a driver may be able to select a desired mode, such as the type of ride desired, and based on that selection, the controller may control actuation of the control valve 28 to provide softer or stiffer roll damping.

Figure 4:
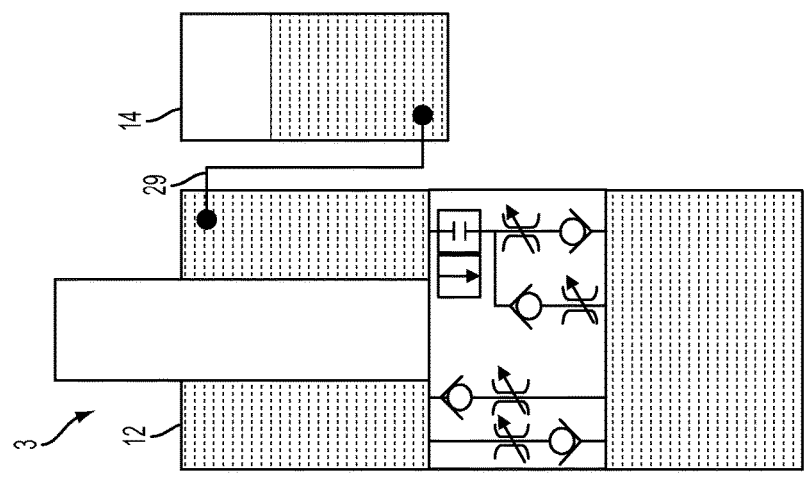
FIG. 4 is a cross-sectional view of a third embodiment of a roll damper to be used in the system of FIG. 1 in accordance with the present teachings.
Figure 3:
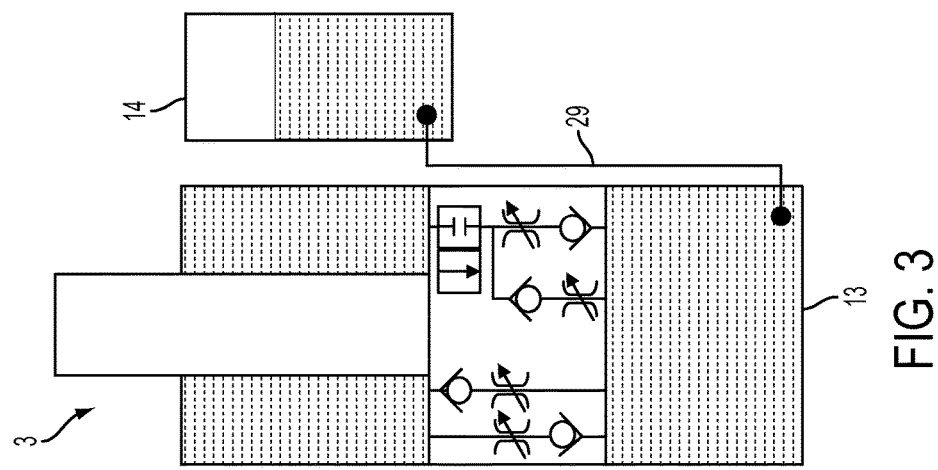
FIG. 3 is a cross-sectional view of a second embodiment of a roll damper to be used in the system of FIG. 1 in accordance with the present teachings.

FIGS. 3 and 4 show alternative exemplary embodiments of the roll damper 3, in which the compensation chamber 14 is arranged externally to the cylinder unit 11 and in which a connecting line 29 is provided. The externally arranged compensation chamber 14 is filled with hydraulic fluid and a gaseous medium. The connecting line 29 is connected to a region of the compensation chamber 14 in which hydraulic fluid is contained. The hydraulic fluid is preferably identical to the hydraulic fluid of the roll damper 3. In the exemplary embodiment shown in FIG. 3, the connecting line 29 leads away from the piston rod 9 into the hydraulic chamber 13 which is the lower chamber in the drawing plane. In the exemplary embodiment shown in FIG. 4, the connecting line 29 leads into the hydraulic chamber 12 on the piston rod side.

Figure 5:
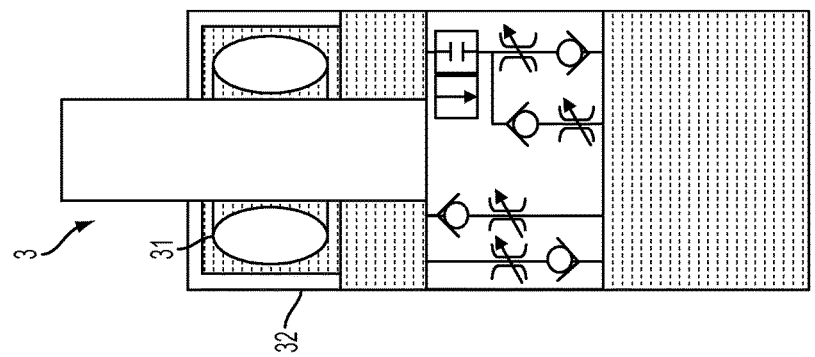
FIG. 5 is a cross-sectional view of a fourth embodiment of a roll damper to be used in the system of FIG. 1 in accordance with the present teachings.

In the exemplary embodiment shown in FIG. 5, the compensation chamber 14 is arranged on the piston rod side in an internal deformable tank 31, wherein a piston stop 32 is also provided. Piston stop 32 is position to prevent destruction of internal deformable tank 31 as it is compressed between piston 8 and a top of cylinder 11.

In FIGS. 3-5, the arrangements of the damping valves 19 and 21 in the hydraulic channels 16, 17, 18 and 22 and 23 are identical to the arrangement in FIG. 2 and/or FIG. 2A.

Figure 6:
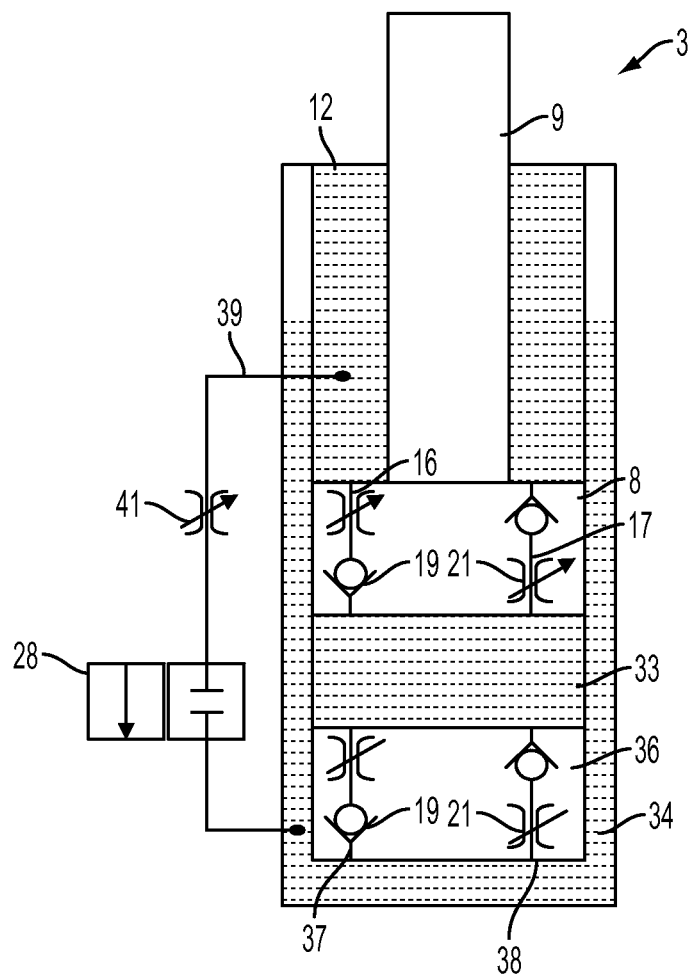
FIG. 6 is a cross-sectional view of a fifth embodiment of a roll damper to be used in the system of FIG. 1 in accordance with the present teachings.

In accordance with another exemplary embodiment of the roll damper 3, FIG. 6 illustrates the adaptable roll damper 3 as double tube system, in which an internal cylinder 33 is surrounded by an outer casing 34. A piston 8 guided on a piston rod 9 is arranged in the cylinder 33, and connecting channels 37 and 38, which are in fluid communication with the outer casing 34, are provided in the base 36 of the cylinder 33. A bypass 39 connects the hydraulic chamber 12 on the piston rod side to the outer casing 34.

In the exemplary embodiment of FIG. 6, damping valves 19 and 21 are arranged both in the piston 8 and in the cylinder base 36. A control valve 28 and an adjustable throttle valve 41 are arranged in the bypass 39. The throttle valve 41 is preferably arranged in the bypass 39 on the piston rod side. The control valve 28 is then preferably provided on the base side, i.e., arranged in the portion of the bypass 39 which is connected to the outer casing 34. In the embodiment of FIG. 6, the compensation chamber is formed within outer casing 34. In such a construction, a lower gas pressure is required in the compensation chamber, as compared to the compensation chambers illustrated in the exemplary embodiments of FIGS. 2, 2A, and 3-5. Additional advantages and differences associated with use of a single tube system versus a twin tube system will be apparent to one of ordinary skill in the art.

Additionally or alternatively, similar to the single tube system (see FIGS. 2-5), one respective control valve 28 also may be arranged in one respective main channel in the piston 8 and in the cylinder base 36, the control valve in each case being able to have one of the above-described damping valves in the channel branches thereof.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A roll damper, comprising:
   a cylinder;
   a piston movably positioned within the cylinder, wherein the piston separates a first hydraulic chamber from a second hydraulic chamber in the cylinder;
   a first hydraulic channel and a second hydraulic channel in the piston, each hydraulic channel providing fluid communication between the first and second hydraulic chambers;
   a first damping valve positioned in the first hydraulic channel and permitting one-way fluid flow from the second hydraulic chamber to the first hydraulic chamber;
   a second damping valve positioned in the second hydraulic channel and permitting one-way fluid flow from the first hydraulic chamber to the second hydraulic chamber; and
   a third hydraulic channel comprising:
     two channels branching from the third hydraulic channel;
     a control valve in fluid communication with the two channel branches; and
     third and fourth damping valves positioned in respective branches of the two channel branches.

2. The roll damper of claim 1, wherein the first damping valve provides a fluid path in a first direction and wherein the second damping valve provides a fluid path in a second direction, opposite the first direction.

3. The roll damper of claim 1, wherein the first damping valve and the second damping valve have different flow rates.

4. The roll damper of claim 1, wherein the control valve is configured to control a rate of fluid flow through the third hydraulic channel.

5. The roll damper of claim 4, wherein a rate of fluid flow through the control valve is based in part on a selected damping characteristic.

* * * * *